Aug. 27, 1935.  C. B. BAZZONI  2,012,455
WELL SURVEYING DEVICE
Filed Feb. 12, 1930  4 Sheets-Sheet 1
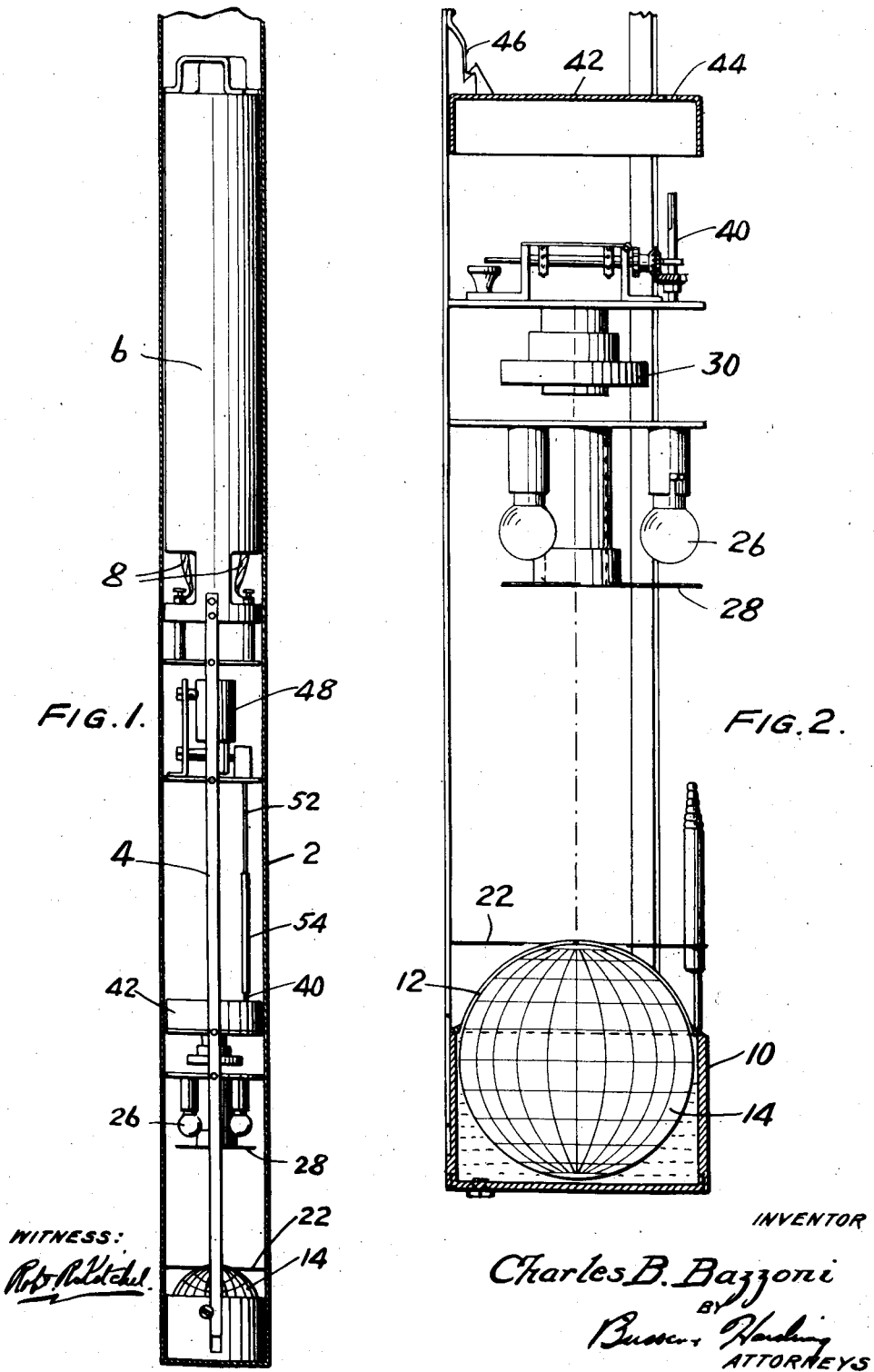

Aug. 27, 1935.    C. B. BAZZONI    2,012,455
WELL SURVEYING DEVICE
Filed Feb. 12, 1930    4 Sheets-Sheet 2

WITNESS:

INVENTOR
Charles B. Bazzoni
BY
ATTORNEYS

Aug. 27, 1935.      C. B. BAZZONI      2,012,455
WELL SURVEYING DEVICE
Filed Feb. 12, 1930      4 Sheets-Sheet 3

INVENTOR
Charles B. Bazzoni
BY
ATTORNEYS.

Aug. 27, 1935. C. B. BAZZONI 2,012,455
WELL SURVEYING DEVICE
Filed Feb. 12, 1930 4 Sheets-Sheet 4
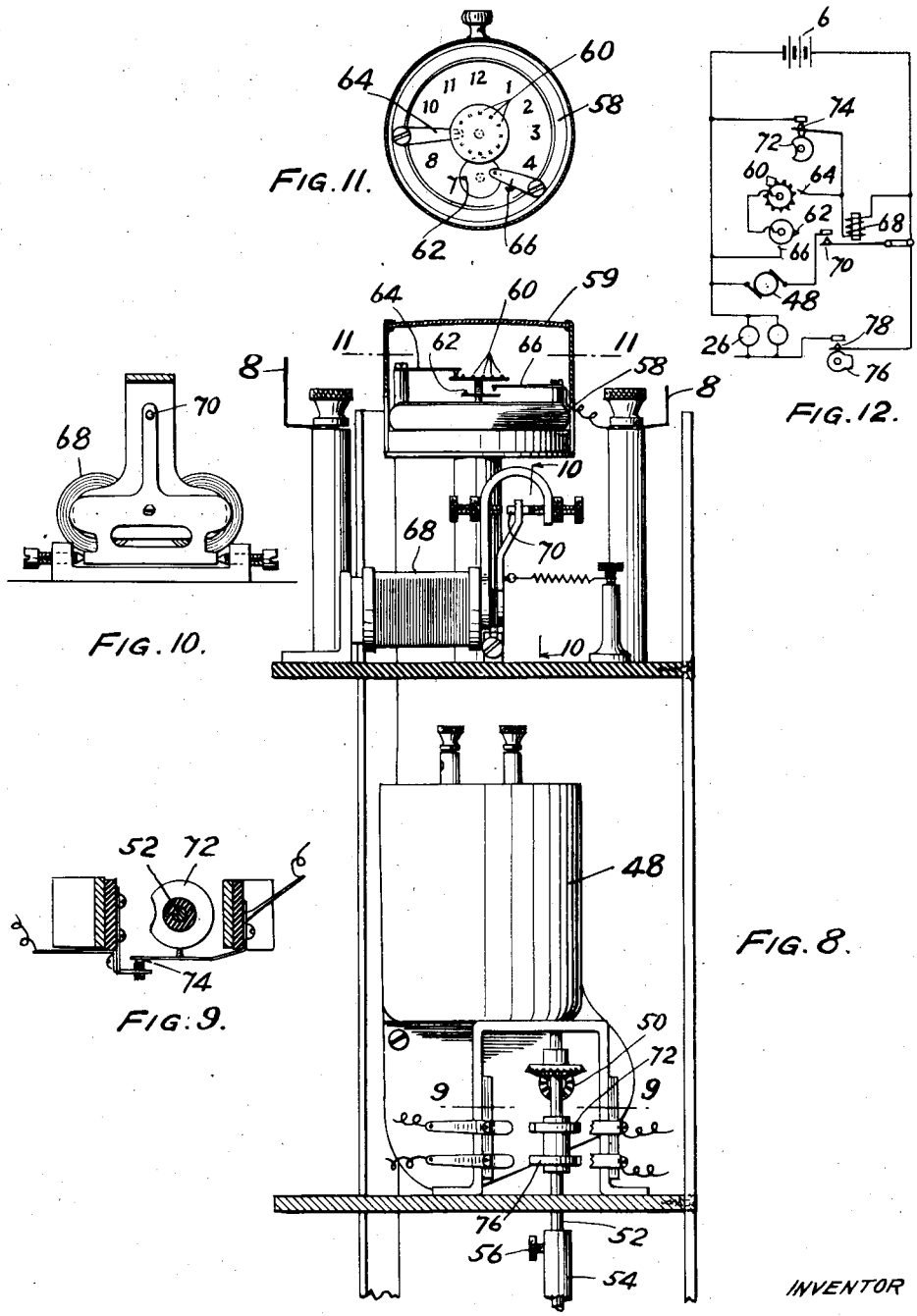

Patented Aug. 27, 1935

2,012,455

UNITED STATES PATENT OFFICE 2,012,455

WELL SURVEYING DEVICE

Charles B. Bazzoni, Swarthmore, Pa., assignor, by mesne assignments, to Sperry-Sun Well Surveying Company, Philadelphia, Pa., a corporation of Delaware Application February 12, 1930, Serial No. 427,904

10 Claims. (Cl. 234—5.3)

This invention relates to a well surveying device of the type adapted to be lowered into a bore hole and arranged to give a photographic record of the orientation of the hole at a given point with respect to both inclination and azimuth.

In drilling oil wells or the like, it may happen, due to variations in the strata through which the drill passes, or to other causes, that the bore hole will deviate to a considerable extent from the vertical and assume very decided angles relative to the vertical direction. As a result of this deviation, serious errors may enter into the geological interpretations and recommendations concerning sub-surface structure, water shut-offs, valuations of property, etc. In view of the resultant desirability of determining the location of any or all parts of a bore hole, various devices have heretofore been devised for determining with more or less accuracy the path of the bore hole through the soil.

The device of the present invention constitutes means for obtaining a substantially continuous record of the deviation of a bore hole throughout its length and includes means for automatically photographing simultaneously the position of a universally mounted sphere which is adapted to maintain a fixed inclination and azimuth relative to the earth and a timepiece, from which photographs the deviation of a hole at various points along its length may be readily determined.

It is the broad object of the present device to provide means for obtaining accurate results in a minimum of time and with a minimum of effort directed toward setting the device.

Heretofore devices have generally been designed to operate from a power supply on the surface. This is impractical by reason of the fact that insulated cables will not withstand the abrasion incident to contact with the sides of a bore hole and short circuits will result. Cables of any suitable type are very expensive and of short life. On the other hand, in those devices heretofore designed in which a self contained battery is included, the battery has generally been constantly connected to a motor for operating various parts of the mechanism. This motor, therefore, necessarily runs from the time the casing is closed at the surface until the readings are taken and the device again opened. The drain on the battery is so considerable that a large battery is necessary, taking up very considerable space and making the device difficult to handle.

One object of the present invention is accordingly the provision of a device in which a clockwork mechanism, using this term in its broad sense of a spring controlled motor, is provided to control the operation of an electric motor, which is generally found necessary in order to furnish sufficient power. In the present device this clockwork mechanism also controls the illumination of the recording instruments for the purpose of photographic exposure.

Another detailed object of the present invention involves the provision of an improved recording means consisting of a floating sphere which, by reason of its containing either a magnet or a number of magnets, or a gyroscope, will maintain a fixed position relative to the earth. In its simplest form this sphere contains magnets, since, unless there is present iron in the vicinity in which readings are to be taken, the magnets may be relied upon to give fairly accurate readings. For very accurate work a more elaborate instrument containing a gyroscope may be constructed in accordance with the invention.

Other objects of the invention relating primarily to details of construction will be apparent from the following description read in connection with the accompanying drawings, in which:

Fig. 1 is a vertical section through a preferred form of the apparatus illustrating the relationship of the various parts;

Fig. 2 is an enlarged view showing the lower portion of the instrument;

Fig. 8 is an elevation partly in section illustrating the controlling elements of the device;

Figs. 9, 10 and 11 illustrate details of the controlling mechanism; and

Fig. 12 is a wiring diagram showing the arrangement and connections of the parts of the controlling mechanism.

The device comprises a casing 2 which is arranged to be received within a pressure resistant and water-tight outer casing of any suitable form. Inasmuch as this modification of the invention is shown as including a magnetic recording device, the various portions of the casing adjacent the magnets should be of a non-magnetic material. The mechanism within the casing 2 is supported by a frame 4 to the upper end of which is secured a battery 6 preferably of the storage type, the leads from which are indicated at 8.

Figure 3:
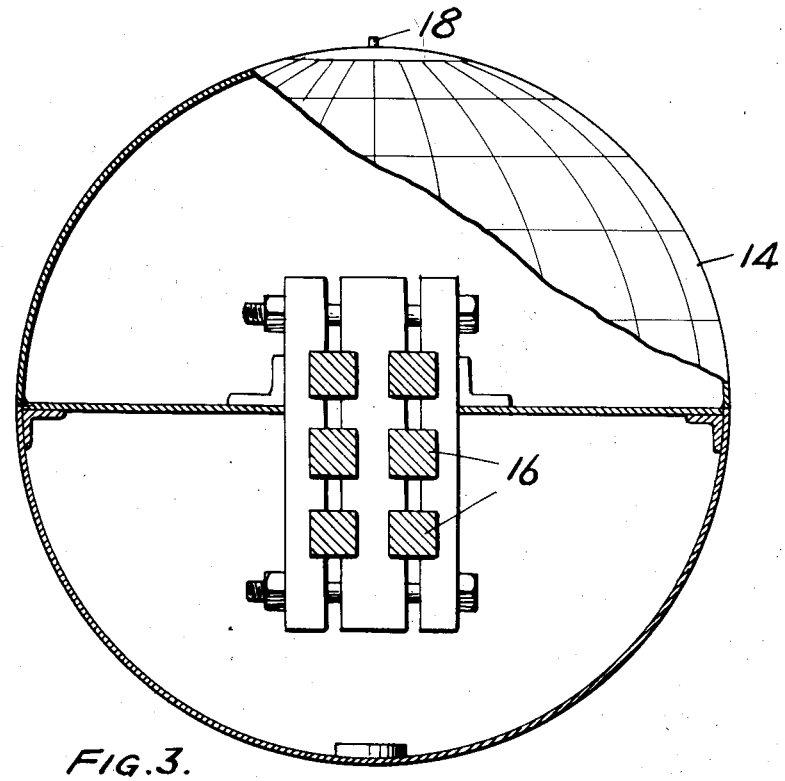
Fig. 3 is a sectional view showing the recording sphere.
Figure 4:
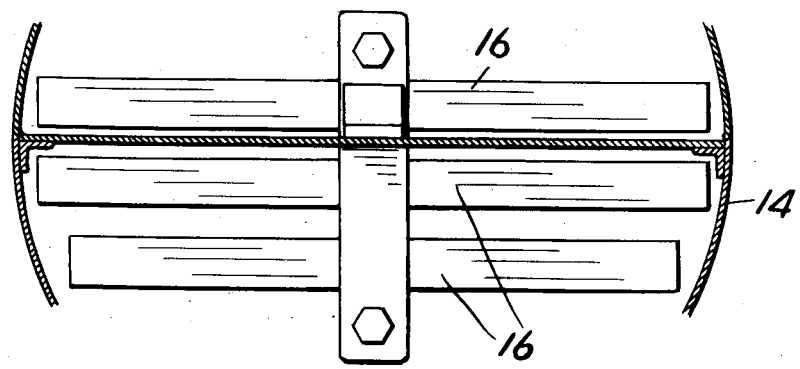
Fig. 4 is a sectional elevation showing the arrangement of the magnets in the sphere.
Figure 7:
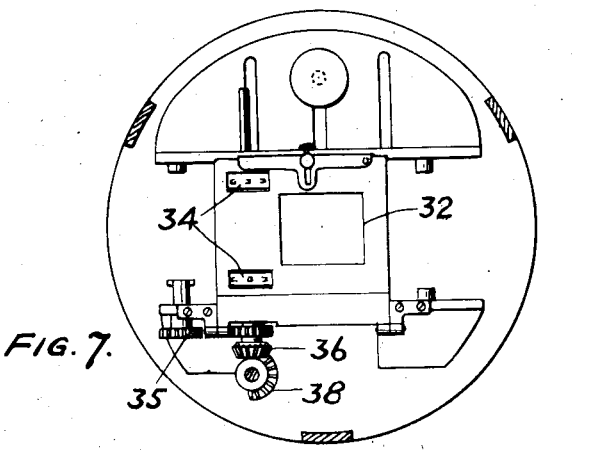
Fig. 7 is a plan view of the camera.
Figure 6:
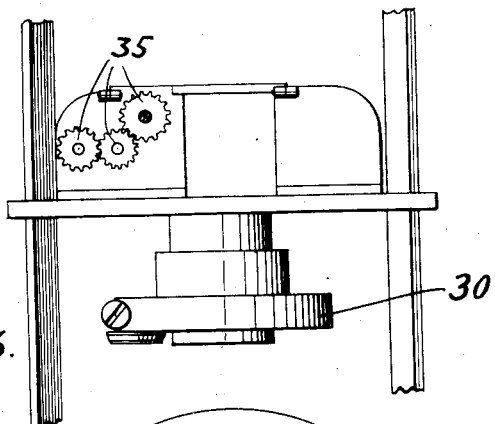
Fig. 6 is an elevation of a camera.

At the bottom of the instrument is a cylindrical casing 10 provided with a hemispherical glass top 12. Located within the casing formed by the cylindrical shell and the top 12 is a hollow sphere 14 of relatively light construction, preferably of brass. Within this sphere are mounted, as illustrated in Figs. 3 and 4, a plurality of magnets 16 which should be of a powerful permanent type such as may be produced by the use of cobalt chrome steel. At the top of the sphere is a small pin 18. The sphere is immersed in a liquid such as a mixture of glycerine and water, preferably consisting of about 125 parts of pure glycerine to 500 parts of distilled water. The specific gravity of the solution is adjusted so that the specific gravity of the sphere is just slightly less. In view of the fact that air is excluded from the chamber so that it is entirely filled with the liquid, the pin 18 bears with a very slight pressure upon the hemisphere 12. Because of its small size and the light pressure, friction is thus reduced to a minimum. The sphere is maintained accurately in vertical position by an adjustable weight at ts lowermost portion, the adjustment being such that the pin points vertically upward. Preferably the center of gravity is as low as possible to insure a maximum torque holding it upright.

Figure 5:
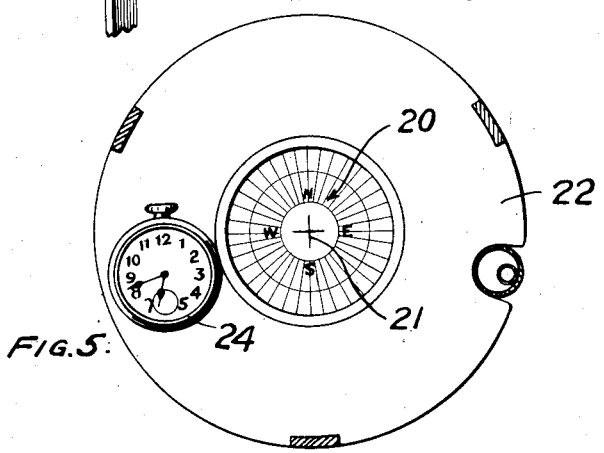
Fig. 5 is a plan view of the recording instruments illustrating the type of record made on the film.

The sphere is provided with markings, as indicated in Figs. 2, 3 and 5, that is, with latitude and longitude marks and the points of the compass, as indicated at 20, and the hemispherical cover 12 is provided with cross markings indicating its top, as indicated at 21. As a result, when the casing is vertical, the pin 18, that is, the uppermost portion of the sphere, will be directly under the center indicated by the markings 21. On the other hand, if the casing is tilted, the center marking 21 will appear directly above another portion of the sphere, which will still maintain its vertical position and its azimuth. The inclination and azimuth of the casing may thus be read directly from the apparatus. It is this view which is photographed to form a permanent record.

While a hemispherical top 12 is illustrated, it will be clear that it may be replaced by a plane top or a top only slightly concave on its lower surface, the central position of the sphere being maintained by regulation of its clearance with the sides of the casing 10 or otherwise.

The use of powerful magnets such as those described insures sufficient torque to turn the sphere against friction into proper position in the earth's magnetic field; that is with the plane of the N—S great circle on the sphere aligned with the field of the earth.

A shield 22 is provided with a relatively small circular opening through which the top of the cover 12 may be viewed. This shield carries a watch 24 which is photographed simultaneously with the sphere for a purpose hereinafter pointed out.

Because of the powerful field of the magnets the watch should be provided with a non-magnetic hair spring if placed as indicated. Alternatively it could be placed in the upper part of the casing facing downwardly, a mirror or set of prisms reflecting its image to the camera.

In order to provide illumination for the recording instruments just mentioned, there are provided lamps 23 shielded as indicated at 28 so that diffused illumination is provided and direct reflection of rays prevented.

The lens system of the camera is indicated at 30, the film passing over a plate provided with a square or circular opening 32 and being fed by sprocket wheels 34 from one reel holder to a receiving holder driven by gearing indicated at 35, to which motion is imparted through a bevel gear 36 meshing with a mutilated bevel gear 38 mounted on a stub shaft 40. A cover 42 is provided to close the camera in a light tight manner, this cover being provided with an opening 44 closely fitting over a stub shaft 40 which has a flattened or square end projecting upwardly therethrough. The cover may be maintained in raised position for the replacement of a film by a latch, shown at 46.

In the upper portion of the mechanism there is carried a motor 48 which, through reduction gearing, drives a vertical shaft 52 on which is mounted a sleeve 54 held in fixed position thereon by a set screw 56. When the cover 42 is raised, this sleeve is drawn upwardly in telescopic relation over shaft 52 and held in uppermost position. When the camera is closed, the sleeve is lowered so that its lower end engages over the upper end of stub shaft 40, the lower end being provided with a socket complementary to the square or flattened upper end of the stub shaft. By this arrangement the shaft 40 is directly driven from the motor through its reduction gearing.

At the top of the mechanism there is located a timepiece 58 preferably covered by a transparent cover member 59. It will be appreciated that the term "timepiece" herein is used in the broad sense of including a spring driven mechanism. The timepiece, which, in the present instance, is illustrated as a watch, may be modified with the provision of a disc carried by the shaft which generally supports the minute hand, the disc being provided with a number of contact points 60 spaced thereabout. In the present instance there are twelve of these contact points so that a substitution of position of one for another occurs every five minutes. This will produce exposures every five minutes. The contact points may, of course, be located closer together or spaced farther apart to produce shorter or longer intervals between the exposures. A fixed contact 64 is arranged to engage the successive contacts 60 as they pass thereunder. Carried by the spindle which supports the second hand is a contact 62 arranged to contact at a point during its revolution with a fixed contact member 66. As illustrated in the wiring diagram of Fig. 12, it will be seen that the pairs of contacts are in series. Assuming that contact between 62 and 66 is maintained, for, let us say, three seconds, it will be obvious that the circuit is closed for three seconds every five minutes. In series with this arrangement of contacts is the solenoid of a relay 68, the circuit being connected across the terminals of the battery 6. The armature contacts 70 of the relay 68 are connected in series with the motor 48 so that when the relay is energized the circuit is closed through the motor, which is thereby started.

To insure that contact between contacts 62 and 66 does not stop the timepiece, the disc and contact 62 may be replaced by an insulating disc through which a platinum wire extends, the wire being ground flush with the upper surface of the disc. The contact 66 then takes the form of a brush wiping over the disc and momentarily passing over the flush end of the wire. The contacts 60 may be similarly formed. This arrangement insures better contacts besides lessening friction.

Mounted on shaft 52 is a cam 72 which, as illustrated in Fig. 9, operates upon a follower spring carrying a contact 74 cooperating with a fixed contact. These contacts are arranged in series with the relay 68 paralleling the contacts of the clockwork mechanism. Th cam 72 throughout the greater portion of its revolution closes the contact 74 but is provided with a depression of relatively short extent into which the follower may fall, thereby breaking contact at 74. At the time when the circuit is closed by the clockwork mechanism and the motor is started, the depression 72 is opposite the follower so that contact at 74 is broken. The arrangement is such, however, that before the relay circuit is opened by movement of the contact 62 away from 66, the contact at 74 is closed and accordingly the relay remains energized and the motor operating. When the shaft 52 makes one revolution, the follower falls into the depression, whereby the relay is de-energized and the motor stopped until the series of contacts in the clockwork mechanism are again made.

During this cycle of operation defined by one rotation of the shaft 56, a second cam 76 mounted thereon closes a contact at 78 for a short period of time, illuminating the lamps 26 so that an exposure of the film is made. This arrangement is preferable, although it will be understood that the lamps might be permanently lighted and exposure made by the momentary operation of a shutter.

After the exposure is made, the teeth of the mutilated gear 38 engage the teeth of gear 36, advancing the film so as to move the exposed portion beyond the aperture 32 and move a new portion of the film into position for a subsequent exposure.

It will be seen, therefore, that during a cycle of operation there occurs first a contact at 64 and 62, thus starting the motor 48. Before the contact in the clockwork is broken, contact is made at 74 so as to maintain the motor operating throughout the cycle. Immediately thereafter an exposure is made and after that the film is automatically moved. The motor then stops. It will be seen from the above that the drain upon the battery is very considerably reduced, since the motor operates intermittently only during small fractions of the total time. For example, a single cycle may take place within a few seconds, whereas the exposures may be spaced by several minutes.

The reason for providing the timepiece 24 is to enable an ascertainment of the depths at which the various exposures are made. This timepiece is synchronized with a timepiece on the surface by means of which the times at which certain lengths of supporting cable are paid out may be noted. The readings of the timepiece 24 after the films have been developed may then be readily translated into terms of the depths at which the various readings are taken.

If desired, the timepiece 24 may be omitted, if the clockwork mechanism 58 keeps sufficiently accurate time as is tne case when, as illustrated, it embodies a watch mechanism. In such case the mechanism 58 is synchronized with the timepiece on the surface and the numbers of the exposures made during a set of readings is noted. It may then be determined that a certain exposure was made at a definite time, at which time a noted length of cable has been paid out. For example, assuming that exposures are made at five minute intervals, the first being made at 2:00 P. M., the sixth exposure would be made at 2:25 P. M., at which time observations on the surface might show that the instrument reached a depth of 600 feet.

Even though the mechanism 58 does not run in absolute synchronism with the surface timepiece, observations of the correspondence of the two timepieces at the beginning and at the end of a series of readings will enable proper corrections to be easily applied. It is therefore sufficient if approximate synchronism is attained.

The apparatus described may have the magnets 16 replaced by non-magnetic weights if it is desired to measure the inclinations of various portions of a bore hole without reference to azimuth. Great accuracy of readings is thus obtainable since the righting torque of the sphere is very high and since the camera is sharply focussed on the critical point thereon for any reading. For such determinations of great accuracy the magnets are preferably absent since varying vertical components of the magnetic field throughout the depth of the hole may affect the slope of a sphere containing a magnet.

What I claim and desire to protect by Letters Patent is:

1. A well surveying device comprising a casing adapted to enter a bore hole, and recording mechanism within the casing, said mechanism including a universally mounted globe arranged to assume a fixed position relative to the earth and means for photographing the globe.

2. A well surveying device comprising a casing adapted to enter a bore hole, and recording mechanism within the casing, said mechanism including a universally mounted globe arranged to assume a fixed position relative to the earth and containing markings indicative of inclination and azimuth, and means for photographing the globe.

3. A well surveying device comprising a casing adapted to enter a bore hole, and recording mechanism within the casing, said mechanism including a globe mounted in liquid for universal movement relative to the casing and arranged to assume a fixed position relative to the earth, the specific gravity of the globe approximating that of the liquid, and means for photographing the globe.

4. A well surveying device comprising a casing adapted to enter a bore hole, and recording mechanism within the casing, said mechanism including a housing having a transparent semispherical cover, liquid in the housing, a globe immersed in the liquid beneath and substantially concentric with the cover and of slightly less specific gravity than the liquid whereby it is mounted for universal movement relative to the casing, and whereby its frictional engagement with the cover is minimized, said globe including means for causing it to assume a fixed position relative to the earth, and means for photographing the globe.

5. A well surveying device comprising a casing adapted to enter a bore hole, and recording mechanism within the casing, said mechanism including a housing having a transparent semispherical cover, liquid in the housing, a globe immersed in the liquid beneath and substantially concentric with the cover and of slightly less specific gravity than the liquid whereby it is mounted for universal movement relative to the casing, said globe having a projection at its top arranged to contact with the cover, whereby its frictional engagement with the cover is minimized, said globe including means for causing it to assume a fixed position relative to the earth, and means for photographing the globe.

6. A well surveying device comprising a casing adapted to enter a bore hole, and recording mechanism within the casing, said mechanism including means for indicating direction, means for photographing said indicating means, a motor arranged to operate the photographing means, a battery for driving the motor, and clockwork mechanism for effecting intermittent operation of the motor by the battery.

7. A well surveying device comprising a casing adapted to enter a bore hole, and recording mechanism within the casing, said mechanism including means for indicating direction, means for photographing said indicating means, a motor arranged to operate the photographing means, a battery for driving the motor, and means for effecting intermittent operation of the motor by the battery.

8. A well surveying device comprising a casing adapted to enter a bore hole, and recording mechanism within the casing, said mechanism including means for indicating direction, a camera for photographing said indicating means, film feeding devices associated with the camera, a battery, means for lighting the indicating means, a motor, controlling devices operated by the motor, and a clockwork mechanism, said elements being connected so that the clockwork mechanism starts the motor which effects a momentary illumination of the lighting means to produce an exposure, and a feed of the film, said motor being continuously energized until the end of a cycle of operation of the controlling devices and being then deenergized.

9. A well surveying device comprising a casing adapted to enter a bore hole, and recording mechanism within the casing, said mechanism including means for indicating direction, a camera for photographing said indicating means, film feeding devices associated with the camera, a battery, a motor, controlling devices operated by the motor, and a clockwork mechanism, said elements being connected so that the clockwork mechanism starts the motor which effects, successively, a momentary exposure and a feed of the film, said motor being continuously energized until the end of a cycle of operation of the controlling devices and then being deenergized.

10. A well surveying device comprising a casing adapted to enter a bore hole, and recording mechanism within the casing, said mechanism including means for indicating direction, means for photographing said indicating means, a motor arranged to operate the photographing means, a battery for driving the motor, clockwork mechanism, and a switch controlled by the clockwork mechanism, said parts being arranged so that operation of the motor by the battery is effected under control of the switch, whereby intermittent operation of the motor under control of the clockwork mechanism is effected.

CHARLES B. BAZZONI.